March 20, 1956   J. R. LAWRENCE   2,738,943
KITCHEN UTENSIL BRACKET
Original Filed May 24, 1947

Inventor
J. Richard Lawrence
Atty.

United States Patent Office 2,738,943
Patented Mar. 20, 1956

2,738,943

KITCHEN UTENSIL BRACKET

J. Richard Lawrence, Worcester, Mass., assignor to The Washburn Company, Worcester, Mass., a corporation of Massachusetts Original application May 24, 1947, Serial No. 750,325. Divided and this application April 4, 1952, Serial No. 280,492

4 Claims. (Cl. 248—293)

This application is a division of my copending application, Serial No. 750,325, filed May 24, 1947, which resulted in Patent No. 2,615,241, issued October 28, 1952.

This invention relates to brackets for kitchen utensils, such as can openers of the crank operated type, and has for its principal object the provision of a bracket designed to be pivotally attached to a wall bracket so that it may be folded upwardly to an out of the way position when not in use.

Another object is to provide for releasably locking such a bracket in folded position a spring-pressed elongated latch pivotally mounted intermediate its ends on the utensil plate and having a tooth on one end arranged to be engaged selectively in either one of two notches provided in the arcuate periphery of the supporting plate on which the utensil plate is pivotally mounted, whereby to permit locking the utensil plate positively and yet quickly releasably in either its lowered operative position or its raised inoperative position, the latch being easily disengageable by finger pressure against a projecting thumb portion provided on the end opposite the tooth.

The invention is illustrated in the accompanying drawing, in which—

Figure 1:
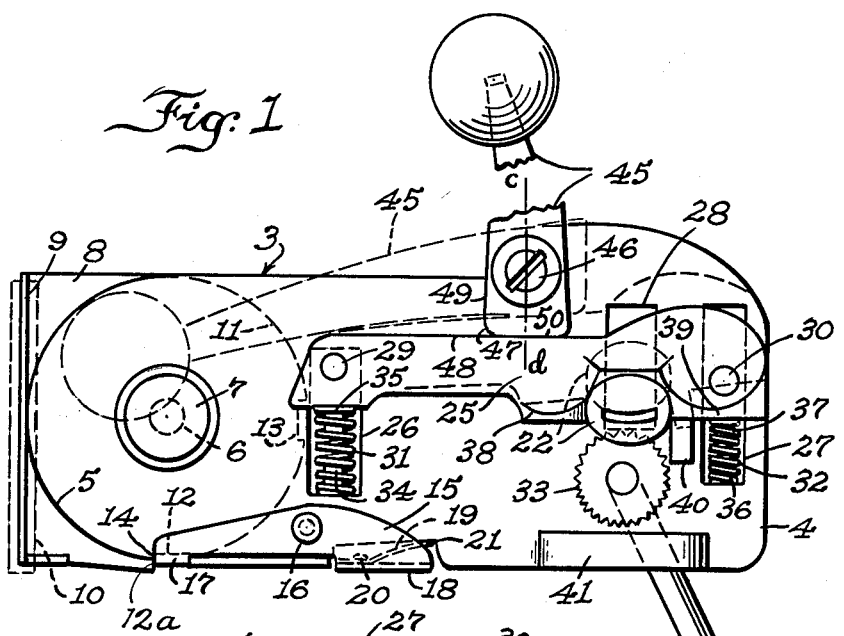
Figure 2:
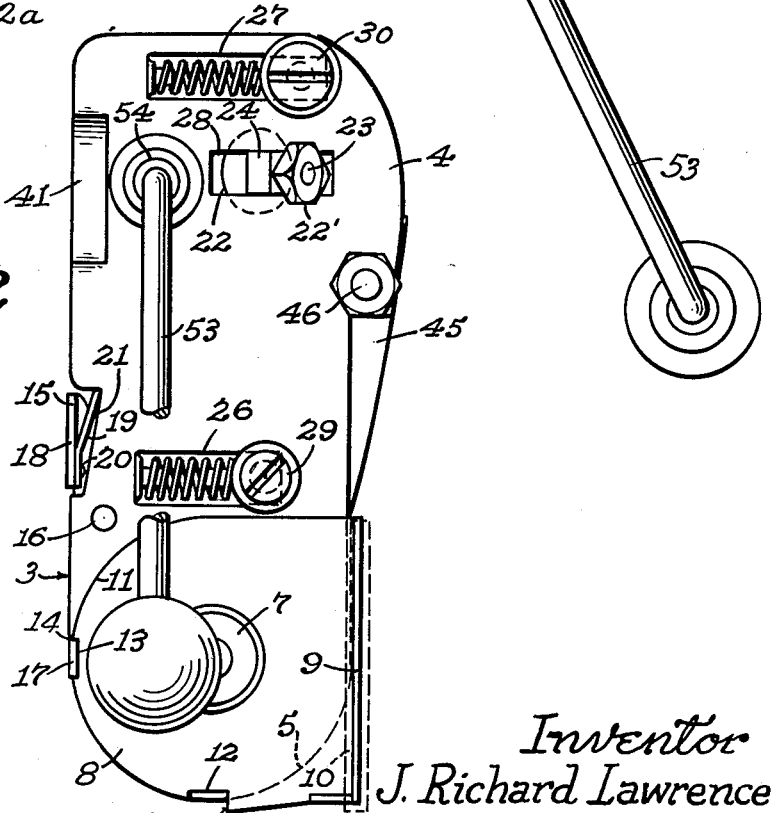

Fig. 1 is a side view of a kitchen utensil bracket made in accordance with my invention and shown in the lowered operative position, and Fig. 2 is a view of the bracket from the opposite side and showing the utensil in its raised or folded inoperative position.

The same reference numerals are applied to corresponding parts in these two views.

Referring to the drawing, the reference numeral 3 designates generally my improved kitchen utensil bracket consisting of a generally rectangular sheet metal utensil plate 4 which, in the present instance, carries a can opener, one end 5 of the plate 4 being cut to semi-circular form in concentric relation to a hole 6 that is on the longitudinal center-line of the plate and which receives the cylindrical shank of a pivot pin 7 pivotally connecting the plate with a sheet metal supporting plate 8. The latter has a keystone-shaped attaching plate 9 welded thereto in a plane at right angles to the supporting plate adapted to have a wedging fit in a flanged retainer plate 10 that is fastened to the wall or kitchen cabinet at any convenient location, the can opener being designed to be swung from the horizontal operative position shown in Fig. 1 upwardly to the vertical retracted or inoperative position shown in Fig. 2. The supporting plate 8 has a semi-circular outer edge 11 in concentric relation to the pivot pin 7, and two notches 12 and 13 are provided in this edge portion spaced circumferentially 90° apart. A notch 14 is provided in the edge portion 5 of the plate 4 arranged to register with either of the notches 12 and 13. An elongated latch 15 is pivoted intermediate its ends on a rivet 16 on the lower edge portion of the plate 4 and has a lug or tooth 17 bent at right angles thereto and arranged to engage in the notch 14 and in whichever of the notches 12 and 13 happens to be in register with the notch 14, the lug 17 being shown engaged in lower notch 12 in Fig. 1 and in upper notch 13 in Fig. 2. The other end of the latch 15 has a wider and longer lug 18 bent at right angles thereto which serves as a thumb-piece adapted to be depressed in releasing the latch against the resistance of an elongated leaf spring 19, that is fastened at one end 20 to the back of the thumb-piece 18 and has slidable engagement at its free end in a notch 21 provided in the lower edge portion of the plate 4. In that way the utensil plate 4 can be unlocked quickly and moved from one position to the other and back again. The lug 17 rides on the arcuate periphery 11 of the supporting plate 8 in the movement of the plate 4 from one position to the other and automatically snaps into place in the notch 12 or 13, as the case may be, at the end of the pivotal movement, positively locking the utensil in a desired position.

A radially downwardly projecting stop shoulder 12a provided on the plate 8 adjacent and flush with the inner edge of lower notch 12 is first engaged by the lug or tooth 17 when the plate 4 is swung down to the operative position shown in Fig. 1, to limit movement of the plate 4, and then guide the lug 17 into notch 12 in plate 8 to lock the plate 4 releasably in the operative position.

The can opener carried on the bracket 3 forms the subject matter of the parent application and need not, therefore, be described in detail in this application, beyond stating that it comprises a cutter wheel 22 having a stem portion 23 integral therewith that is rotatably mounted in a bearing 24 provided on an axis inclined at an acute angle with respect to the vertical plane of the plate 4 in an elongated cast plate 25. This plate 25 is floatingly mounted on the utensil plate 4 and slidably guided at its opposite ends in vertical slots 26 and 27. The bearing portion 24 of the plate 25 projects through and is movable in a vertical slot 28. A nut 22' is threaded on the reduced end of the stem 23 protruding from the bearing 24, whereby to hold the cutter wheel in place and yet permit easy removal and replacement. Screws 29 and 30, the shanks of which extend through the slots 26 and 27, respectively, serve to hold the movable plate 25 in assembled relation to plate 4. Coiled compression springs 31 and 32 disposed in the slots 26 and 27 normally urge the plate 25 upwardly to the dotted position shown in Fig. 1, in which the cutter wheel 22 is in retracted position relative to the feed roller 33 to permit placing the flanged top of a can in position therebetween for opening. There are two horizontal projections 38 and 39 provided on the plate 25 on opposite sides of the cutter wheel 22 arranged to rest on top of the flange of the can in front of and behind the cutter wheel in the can opening operation to guide the can slidably in its rotary movement during this operation and thus assure maintaining the correct relationship of the cutter wheel 22 and feed roller 33 relative to the can throughout the operation. A lug 40 projecting downwardly from the plate 25 under the projection 39 bears against the outer side of the flanged top of the can to keep it in spaced relation to the spring 32, without, however, interfering with the proper engagement of the feed roller with the bottom edge of the flange on the can, as required for most efficient operation of the can opener. A further guide for the can is provided by a protruding elongated strap portion 41 struck from the lower edge portion of the plate 4 in parallel relation to the plate below the feed roller 33 to engage the side of the can. A cam lever 45 is pivoted to the upper edge portion of the plate 4, as indicated at 46, and has its cam-shaped end portion 47 arranged to slide on the upper edge 48 of the plate 25 to impart downward movement thereto against resistance of springs 31 and 32. One edge 49 of the cam-shaped end 47 is approximately in right angle relation to another edge 50, and the lever 45 is movable from a substantially horizontal position in approximate parallelism with the plate 25, as shown in dotted lines in Fig. 1, to a vertical dead-center position substantially at right angles to the plate 25, as shown in full lines in the same figure, whereby to move the plate 25 downwardly and cause the cutter wheel 22 to pierce the top wall 51 of the can alongside the flange thereon. When the cutter wheel 22 pierces the top of the can, a feed roller provided on the back of the cutter wheel is pressed at the same time against the top of the flange on the can so as to cause the cutter wheel 22 to be turned as the can is thereafter turned in the can opening operation, whereby to make for easier cutting and avoid concentrating wear and tear on one portion of the cutter wheel. A crank 53 suitably mounted in the bearing 54 provided on the utensil plate 4 is drivingly connected with the feed roller 33 to turn the same.

It is believed the foregoing description conveys a good understanding of the objects and advantages of my invention. The appended claims have been drawn to cover all legitimate modifications and adaptations.

I claim:

1. In a kitchen utensil bracket suitable for supporting a can opener or the like, comprising an elongated utensil plate disposed in a substantially vertical plane, and a supporting plate adapted to be secured to a vertical support, said supporting plate being disposed parallel to said utensil plate and pivotally connected thereto for pivotal movement on a horizontal axis from a lowered position at right angles to the support to a raised position parallel to said support, the improvement which consists in the provision on said utensil plate of a rectangular notch of appreciable width provided in its lower edge on the pivoted end, and the provision on said supporting plate of an arcuate edge struck on a radius with the aforesaid pivot as a center and having a lower notch and an upper notch both of the same size and shape as the notch in the utensil plate and provided in said edge portion approximately 90° apart with either of which the notch in the utensil plate is arranged to register in the lowered and raised positions of said utensil plate, and the further provision on said utensil plate of an elongated spring pressed latch pivoted intermediate its ends on the lower edge portion of said utensil plate and having a laterally projecting rectangular tooth on one end which is of appreciable width and substantially parallel to a tangent to the aforesaid arcuate edge and is always entered in the notch in said utensil plate as a guide and is adapted to enter either notch in the supporting plate when registering therewith, said tooth being adapted to lie tangent to and slide along the arcuate edge of said supporting plate in the pivotal movement of said utensil plate from the one aforesaid position to the other, said latch having a manually engageable thumb portion on the other end for release of the latch.

2. A kitchen utensil bracket as set forth in claim 1 wherein the supporting plate also has a stop shoulder provided thereon extending radially downwardly from the inner edge of the lower one of the notches for engagement by the tooth on the latch to limit pivotal movement of the utensil plate relative to the supporting plate and guide said tooth into the lower notch in said supporting plate.

3. A bracket structure comprising an angularly shiftable vertical plate of elongated form having a semi-circular contour on one end, a fixed vertical supporting plate having means on an inner end for fastening the same to a vertical wall and having a semi-circular outer end of approximately the same radius as the aforesaid semi-circular portion of the shiftable plate, said plates being pivotally connected in abutting relation, and with the semi-circular portions concentrically disposed, the semi-circular edge of the fixed supporting plate having a plurality of circumferentially spaced rectangular notches of appreciable width provided therein, the semi-circular edge of the shiftable plate also having a rectangular notch of the same width as each of the aforesaid notches provided therein adapted to register with either of the notches in the fixed supporting plate, and a spring pressed latch carried on said utensil plate having a laterally projecting rectangular tooth which is of appreciable width and substantially parallel to a tangent to the aforesaid semi-circular edge of the fixed supporting plate and is always engaging in the notch in said shiftable plate as a guide and engageable selectively in either of the notches in said fixed supporting plate and adapted to lie tangent to and slide along the semi-circular edge of the supporting plate in moving from one notch to the next.

4. A bracket structure as set forth in claim 3 wherein the fixed supporting plate has a stop shoulder provided thereon extending radially outwardly from one side of an end one of the notches in the fixed supporting plate arranged to be engaged by the tooth on the latch first to limit the pivotal movement of the shiftable plate relative to the fixed supporting plate and then guide the tooth into the said end notch in said fixed supporting plate.

References Cited in the file of this patent

UNITED STATES PATENTS

| | | |
|---|---|---|
| 550,779 | Buchholz | Dec. 3, 1895 |
| 835,992 | Truax | Nov. 13, 1906 |
| 1,040,462 | Thruman | Oct. 8, 1912 |
| 1,549,094 | Lamb | Aug. 11, 1925 |
| 1,666,568 | Jackson | Apr. 17, 1928 |
| 2,074,094 | Rush | Mar. 16, 1937 |